July 6, 1937.  C. B. ULRICH  2,086,322
SYSTEM OF MINERAL TREATMENT FOR RECOVERING RARE METALS
Filed Jan. 16, 1933    7 Sheets-Sheet 1
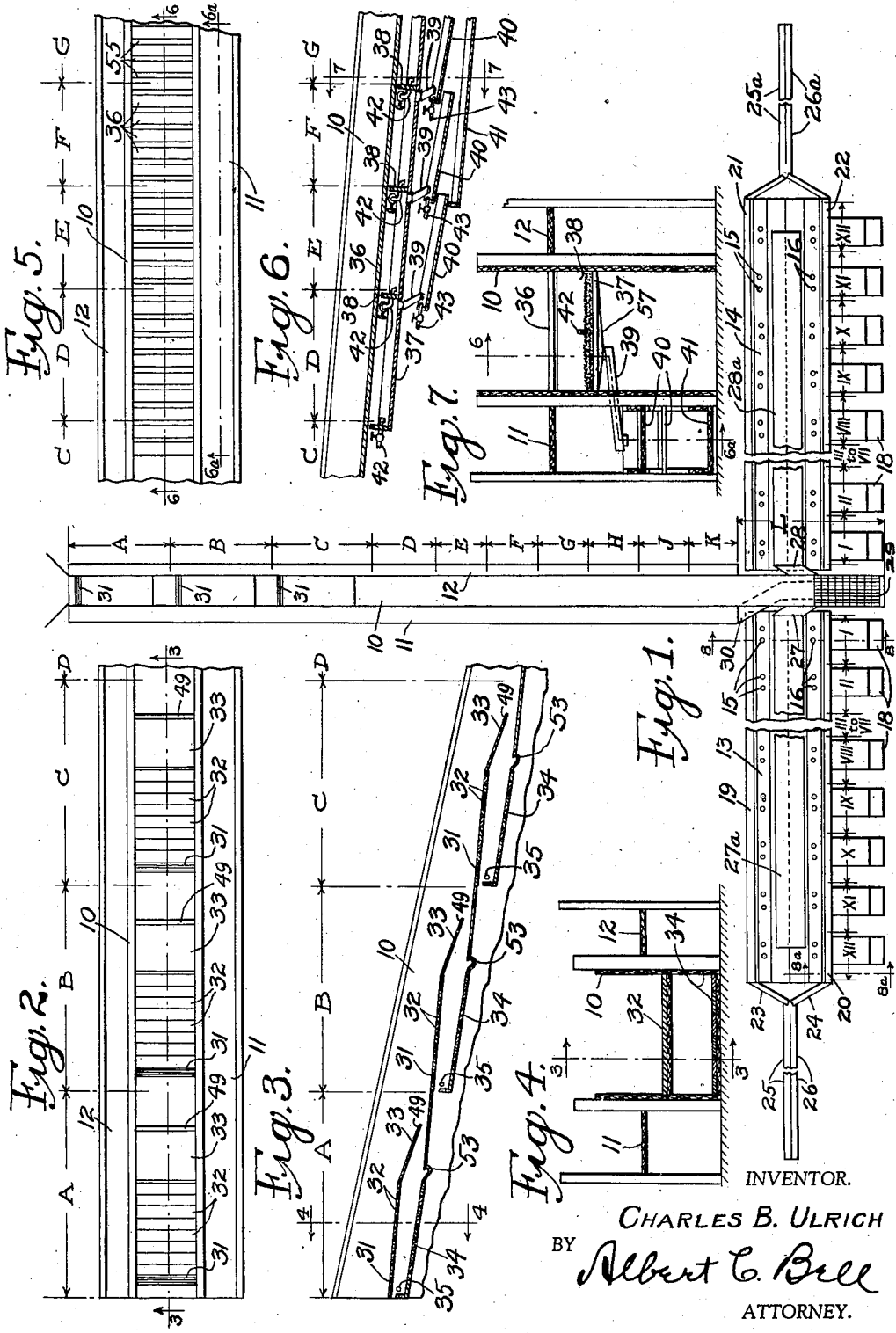
INVENTOR.
CHARLES B. ULRICH
BY Albert C. Bell
ATTORNEY.

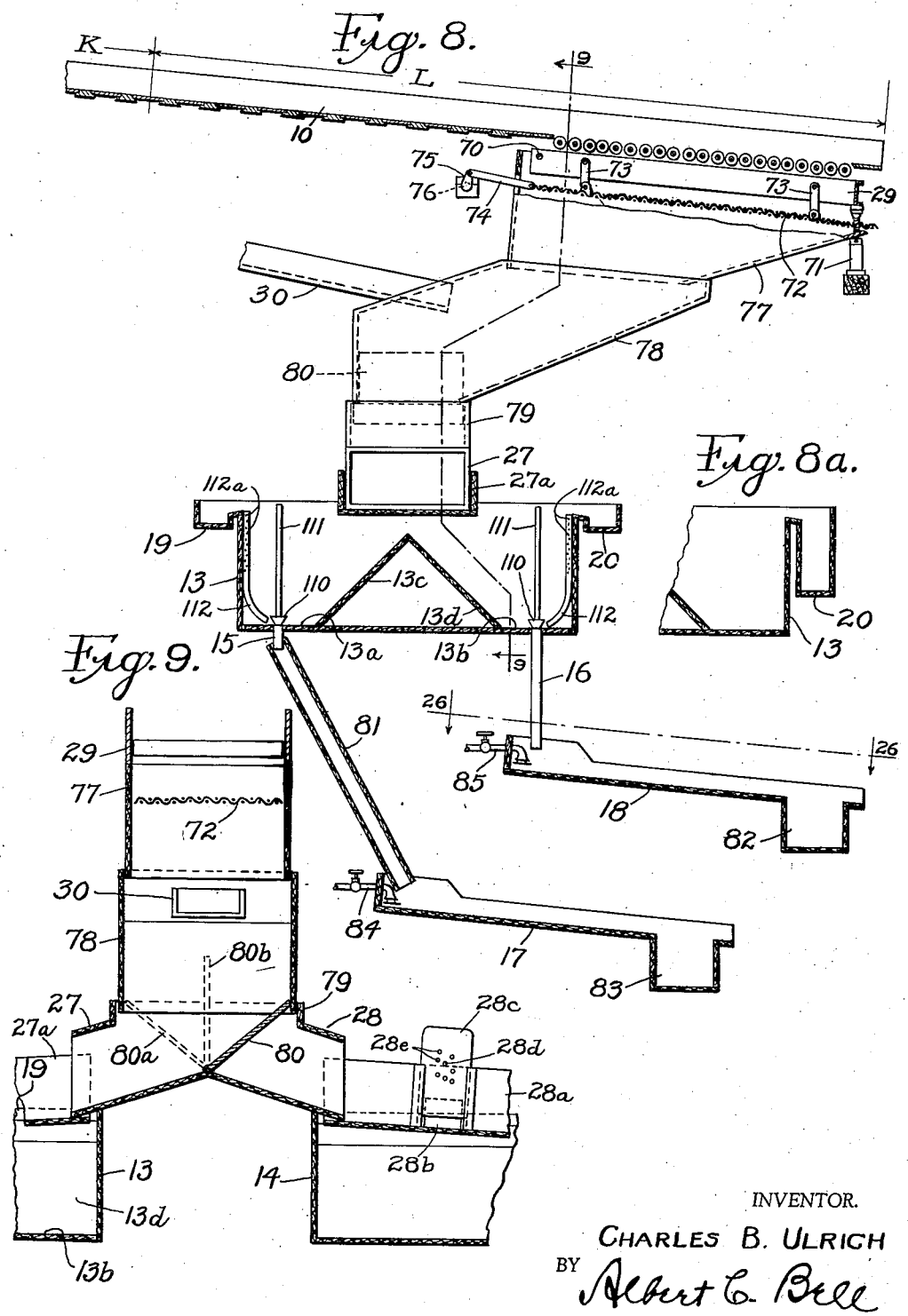

July 6, 1937.  C. B. ULRICH  2,086,322
SYSTEM OF MINERAL TREATMENT FOR RECOVERING RARE METALS
Filed Jan. 16, 1933  7 Sheets-Sheet 3
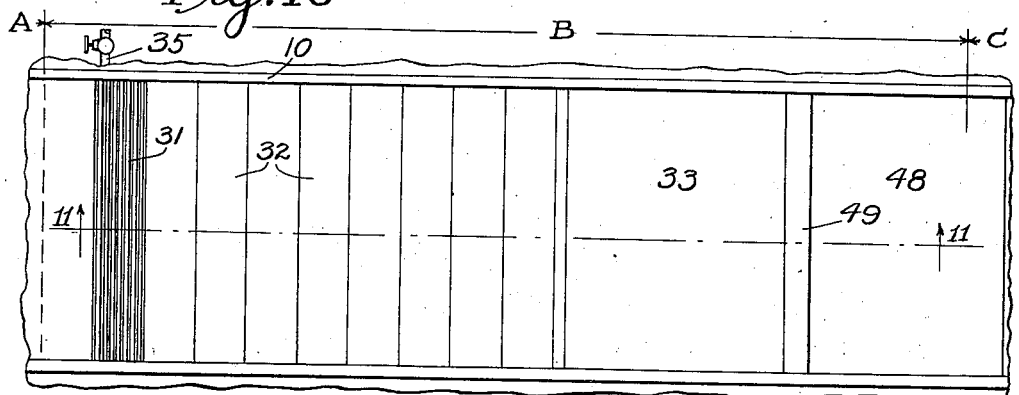
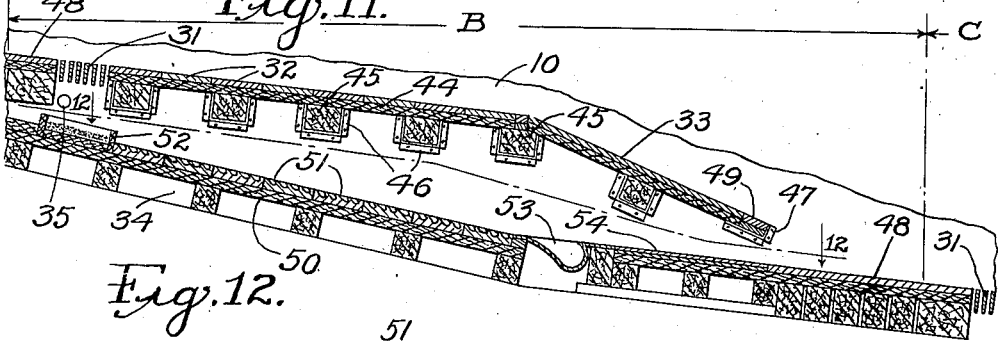
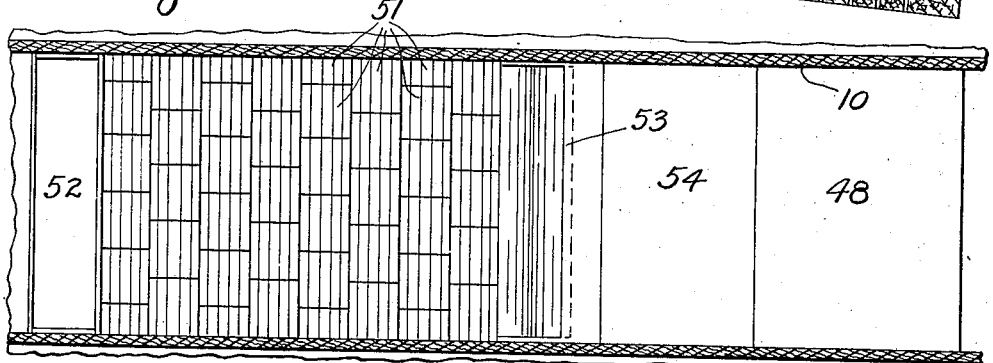
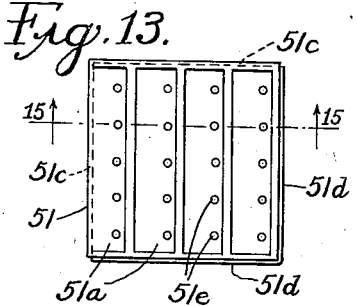
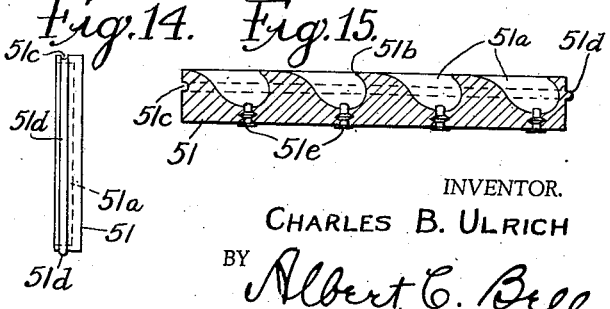
INVENTOR.
CHARLES B. ULRICH
BY Albert C. Bell
ATTORNEY.

July 6, 1937.  C. B. ULRICH  2,086,322
SYSTEM OF MINERAL TREATMENT FOR RECOVERING RARE METALS
Filed Jan. 16, 1933  7 Sheets—Sheet 4
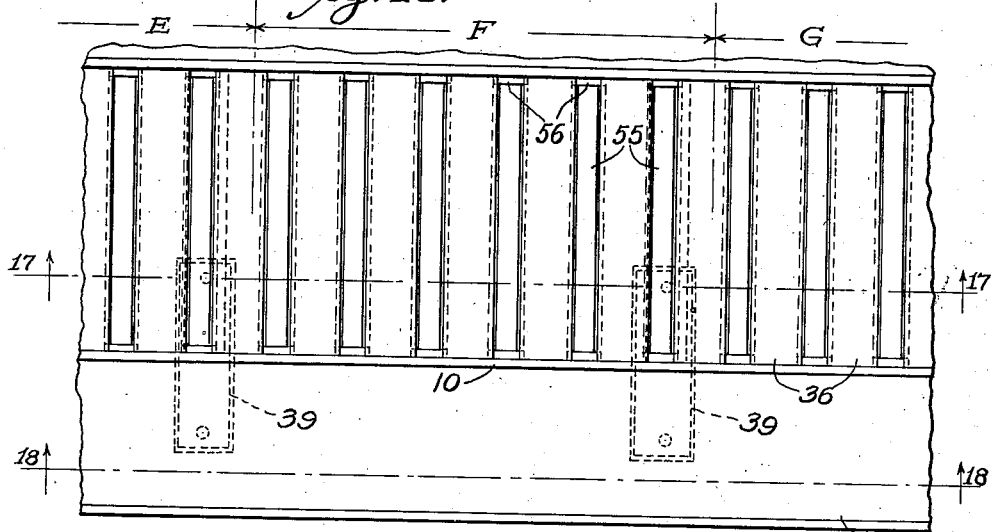
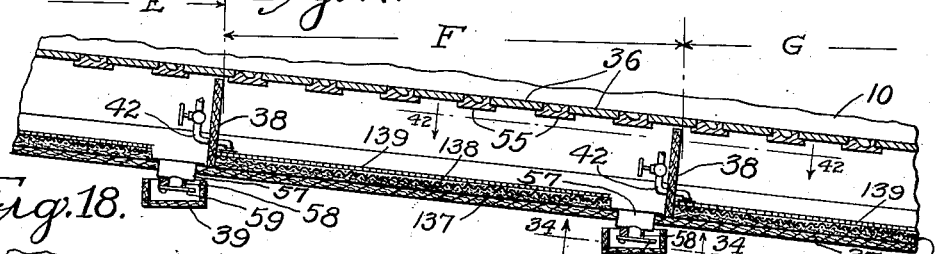
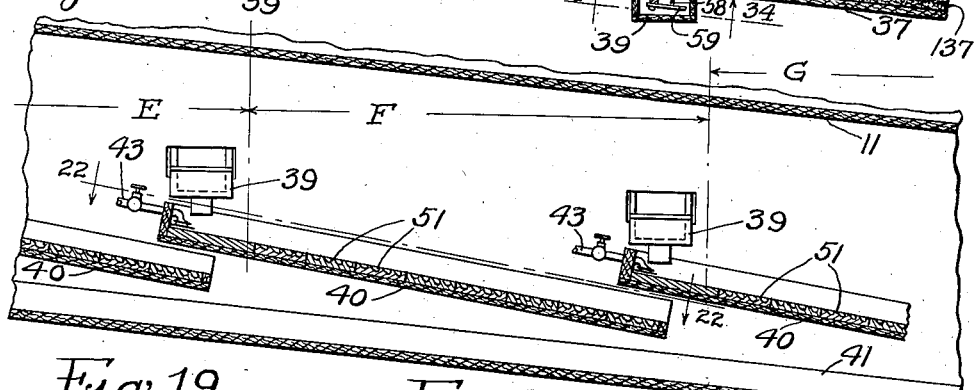
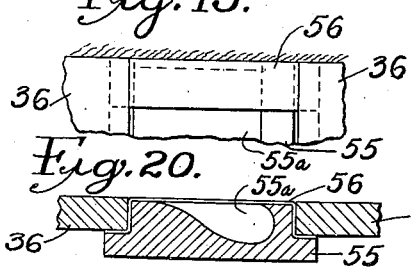
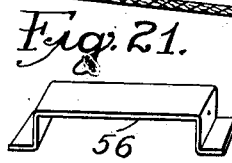
INVENTOR.
CHARLES B. ULRICH
BY Albert C. Bell
ATTORNEY.

July 6, 1937. C. B. ULRICH 2,086,322
SYSTEM OF MINERAL TREATMENT FOR RECOVERING RARE METALS
Filed Jan. 16, 1933 7 Sheets-Sheet 5
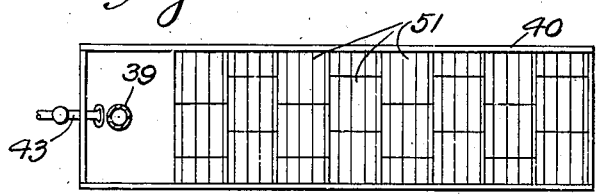
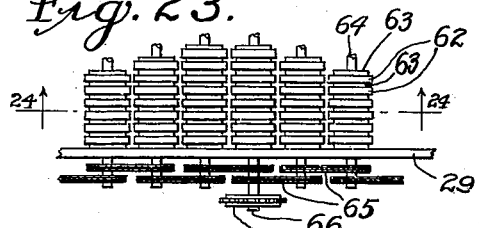
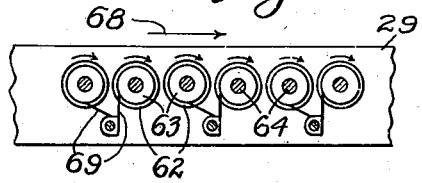
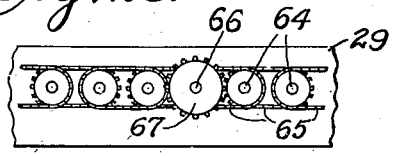
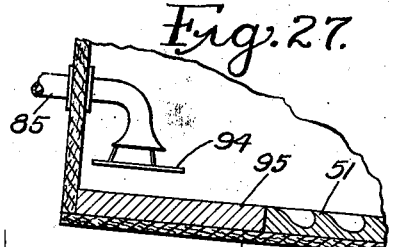
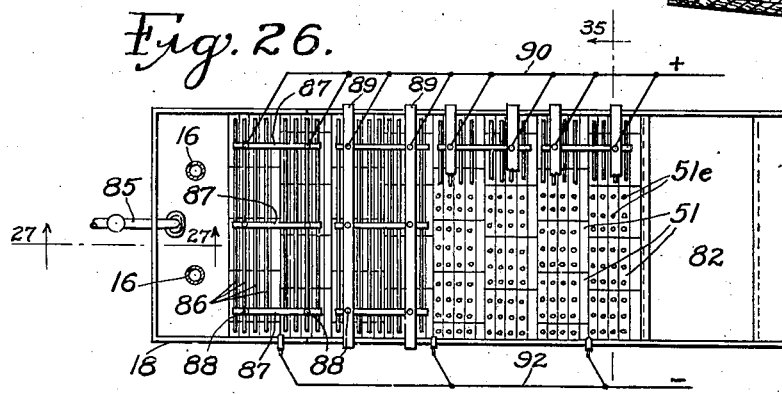
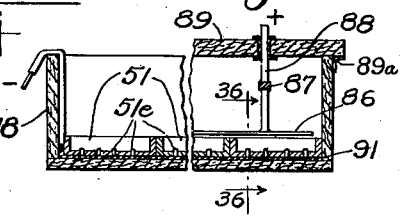
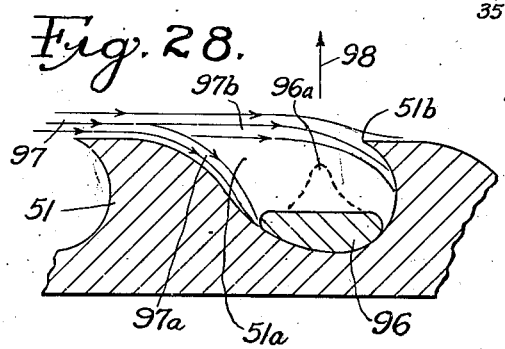
INVENTOR.
CHARLES B. ULRICH
BY Albert C. Bell
ATTORNEY.

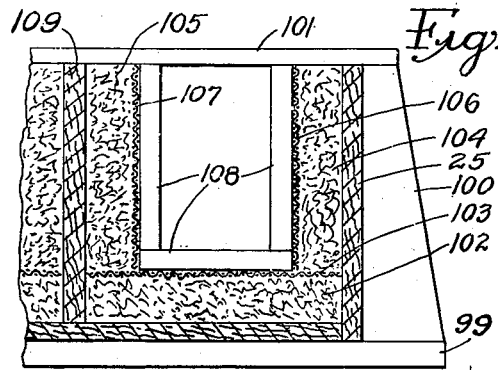
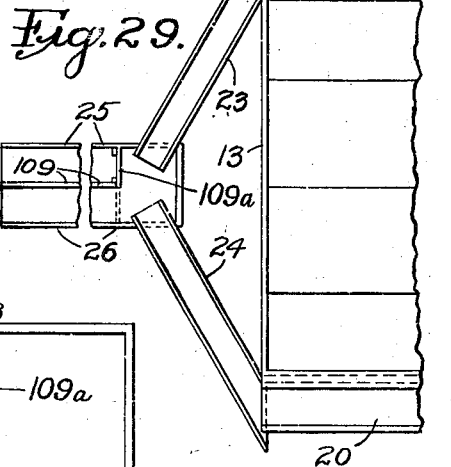
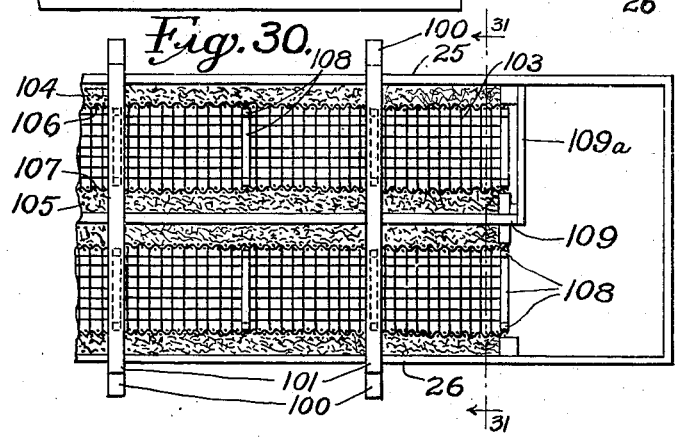
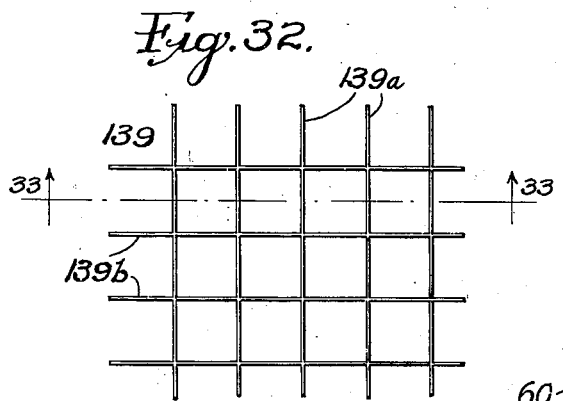
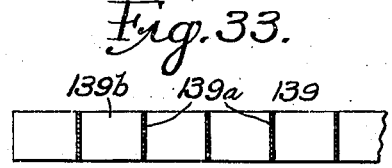
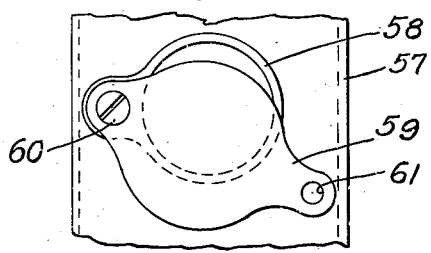
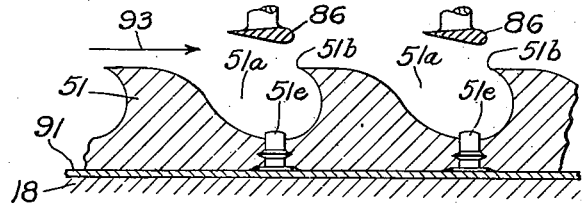

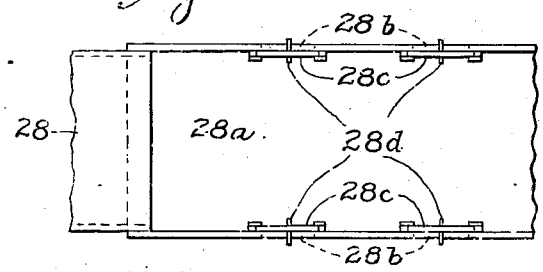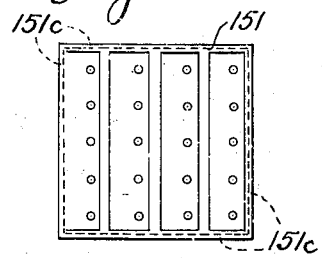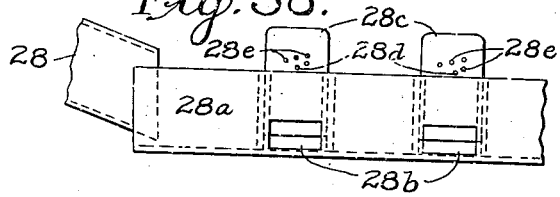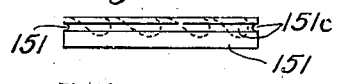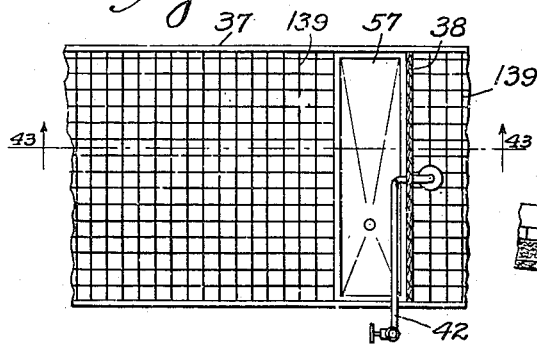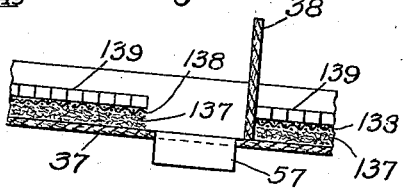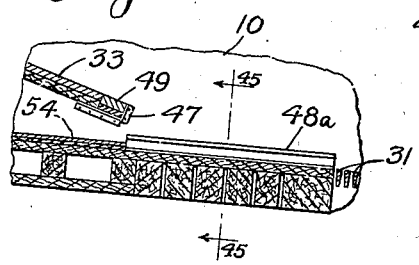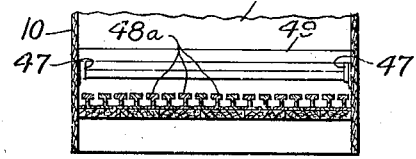

Patented July 6, 1937

2,086,322

UNITED STATES PATENT OFFICE 2,086,322

SYSTEM OF MINERAL TREATMENT FOR RECOVERING RARE METALS

Charles B. Ulrich, Jamestown, N. Y.

Application January 16, 1933, Serial No. 651,887

21 Claims. (Cl. 209—12)

My invention consists of improved means for treating minerals to recover the precious metals therefrom, by different treatments adapted to the different metals to be recovered and adapted also to the different sizes of the pieces or particles of the metals as they exist in the mineral being treated, as well as the method of treatment involved. By my invention I much more effectively recover the values than where the mineral is subjected to but one kind of treatment to recover the values therefrom.

My invention is described herein, in connection with placer mining, but it will be understood that it is equally applicable to the treatment of mineral matter mined in other ways and prepared for the recovery of valuable metal or metals therefrom, in any manner that may be necessary or desirable, depending upon the nature of the mineral matter, and whether it is free milling or not.

In placer mining in the past, the water and broken up mineral, having generally been delivered to a main sluiceway provided with riffles of one kind or another holding mercury, so that the particles of gold and other metals susceptible of amalgamation, will drop by gravity through the flowing water in the sluiceway, and combine with the mercury and be retained thereby, the resulting amalgam being removed from the sluiceway from time to time, and the metals recovered therefrom, all in a manner well known in the art. The procedure just stated, is open to the disadvantage that on account of the water flow in the sluiceway being generally rapid, unless the metal particles are large enough to drop through the water against its flow, they are carried by the stream over the riffles and delivered from the tail end of the sluiceway with the waste mineral matter carried by the water stream. As a result, the treatment heretofore employed has been quite inefficient. This is due to a variety of causes, among which may be mentioned; first, the sanding, or filling with sand and fine mineral, of the recovery compartments in the sluiceway, and second, the entire lack of means for recovering the fine metal particles of value, held in suspension with the other suspended material in the water flow.

By my invention, I provide apparatus and a method of treatment of the mineral matter delivered to the system for treatment, which, regardless of the nature of the mining and preliminary treatment employed to prepare the mineral matter for the recovery of valuable metal particles therefrom, classifies the metal and mineral particles according to size, and then applies to the metal particles of each size, a recovery treatment particularly adapted to metal particles of that size, and by my invention, I also classify separate from each other and recover metal particles that are readily susceptible of amalgamation with mercury, metal particles that do not readily so amalgamate but which will do so when suitably treated and metal particles that will not so amalgamate under any conditions. By my invention, I effectively recover from mineral matter, not only the more common of the valuable metals, such as gold, silver and platinum, but also the rare metals, such as iridium, palladium, ruthenium and osmiridium. The several classifications of mineral are preferably treated in corresponding stages, and each stage of treatment may consist of as many treating sections as required.

In connection with placer mining, I find that the pieces or particles of metal desired to be recovered, exist in different forms and sizes, as they are delivered with the water to the sluiceway. Generally speaking, these pieces or particles may be given three classifications, first, the pieces or particles of large enough size to drop positively through the water stream in the sluiceway, so that they will move along the bottom wall of the sluiceway and engage whatever means may be employed to collect them from the mineral and water flowing through the sluiceway, which pieces or particles for convenience may be referred to as coarse metal particles; second, pieces or particles of metal smaller than the coarse metal particles, and which on account of their smaller size, are carried somewhat freely by the water stream, so that they do not settle through the water as readily as do the coarse metal particles, but which, if given a short time, will find their way to the bottom of the sluiceway, particularly if there are no eddy currents set up in the water flow, for example as produced by riffles, which pieces or particles may for convenience be called medium metal particles; and third, particles of metal smaller than the medium metal particles and so fine that they will not settle through the water stream, even if given a comparatively long time to do so, but which on the other hand may be carried by the water flow throughout the entire length of the sluiceway, which particles for convenience may be called fine metal particles.

By my invention, as applied to placer mining, I provide in connection with the main sluiceway, first devices for diverting or by-passing from the flow of the main sluiceway, the coarse metal particles and subjecting them to amalgamation under conditions adapted to the size of said particles; also, second devices for diverting or by-passing from the flow of the main sluiceway, the medium metal particles and subjecting them to recovering treatments adapted to the size of said particles; also, third devices for collecting and delivering the fine metal particles to recovering treatments adapted to the small size of said particles; and also further devices for collecting and retaining the fine particles of metal not previously collected, particularly the particles of rare metals, so that they will not be lost. In this way, I provide a treatment for each class of metal particles, which is adapted to recover that class of particles from the water and mineral delivered to the main sluiceway, and as a result, the efficiency of operation of my system is relatively great, it being not unusual to recover several times as much value from the mineral being treated, as has been possible with placer systems heretofore employed. By my invention I also enclose the value recovering devices associated with the main sluiceway, so that they cannot be reached or disturbed during the flow of water through the main sluiceway, and in this way I prevent theft of the recovered metals. The other treatment devices provided for by my system, after the mineral to be treated has left the main sluiceway, may also be protected against theft, by enclosing them in suitable shelters or sheds.

By my invention, in connection with the diversion of water from a sluiceway as referred to, I provide means for returning all of the diverted water to the flow in the sluiceway, when it leaves the corresponding treatment section and before the next diversion of water and mineral from the sluiceway. This maintains a practically uniform water flow in the sluiceway where such treatment sections are employed, which is desirable, particularly in connection with placer mining, since the effective movement of large pieces of mineral, and other material if it gets into the sluiceway, depends upon the maintaining in the sluiceway of a rapid flow of a sufficient quantity of water to effect such movement.

My invention will best be understood by reference to the accompanying drawings, illustrating a preferred embodiment thereof, in which Fig. 1 is a diagrammatic plan view to a small scale, of a main sluiceway of a placer system, associated control tanks and auxiliary treatment devices for effecting the operations referred to, Fig. 2 is a plan view to an enlarged scale, of the upper end portion of the main sluiceway, illustrating the devices employed for diverting coarse metal particles from the main sluiceway, Fig. 3 is a vertical, sectional view of the parts shown in Fig. 2, taken along the line 3—3, Fig. 4 is a vertical, sectional view to a further enlarged scale of the construction illustrated in Fig. 3, taken along the line 4—4, Fig. 5 is a plan view to a scale larger than that used in Fig. 1, of the portion of the main sluiceway involved in diverting medium metal particles from the main sluiceway, Fig. 6 is a vertical, sectional view of a part of the construction illustrated in Fig. 5, taken along the line 6—6, the lower part of this figure illustrating in similar view, another part of the construction shown in Fig. 5 taken along the line 6a—6a, the entire view shown in Fig. 6 being taken along the line 6—6a in Fig. 7, Fig. 7 is a vertical, sectional view to a further enlarged scale, of the construction illustrated in Fig. 6, taken along the line 7—7, Fig. 8 is a vertical, sectional view to an enlarged scale, of a part of the construction shown in Fig. 1, taken along the line 8—8, the upper portion of the parts shown in this figure having their side walls adjacent the observer removed, to more clearly illustrate the structure involved, Fig. 8a illustrates in a view similar to Fig. 8, a part of the construction of one of the control tanks, this view being taken along the line 8a—8a in Fig. 1, Fig. 9 is a vertical, sectional view of the construction illustrated in Fig. 8, taken along the line 9—9, Fig. 10 illustrates in plan view to a larger scale than that used in Fig. 2, the portion of the upper end of the main sluiceway involved in one section of treatment of the coarse metal particles, Fig. 11 is a vertical, sectional view of the parts shown in Fig. 10, taken along the line 11—11, Fig. 12 is a horizontal, sectional view of the parts shown in Fig. 11, taken along the line 12—12, Fig. 13 illustrates in plan view, to a further enlarged scale, one of the riffle blocks preferably used in connection with the devices illustrated in Fig. 12, Fig. 14 is an edge view of the riffle block illustrated in Fig. 13, Fig. 15 is a vertical, sectional view to a further enlarged scale, of the riffle block illustrated in Fig. 13, taken along the line 15—15, Fig. 16 illustrates in plan view and to a larger scale than that used in Fig. 5, one of the sections of the main sluiceway involved in diverting medium metal particles from the main sluiceway, Fig. 17 is a vertical, sectional view of the construction illustrated in Fig. 16, taken along the line 17—17, Fig. 18 is a vertical, sectional view of the construction illustrated in Fig. 16, taken along the line 18—18, Fig. 19 shows in plan view and to a larger scale than that used in Fig. 16, the means employed to support the bottom plates of the main sluiceway illustrated in Fig. 16, Fig. 20 is a lower end view of the bottom plates and supporting bar illustrated in Fig. 19, Fig. 21 is a perspective view of the spacing member employed between the supporting bar and bottom plates illustrated in Figs. 19 and 20, Fig. 22 is a horizontal, sectional view of a part of the construction illustrated in Fig. 18, taken along the line 22—22, and shows in plan view one of the riffle boxes employed to collect the medium metal particles, Fig. 23 illustrates in plan view and to a scale larger than that used in Fig. 1, a part of the roller grizzly located at the lower end of the main sluiceway, Fig. 24 is a vertical, sectional view of the parts illustrated in Fig. 23, taken along the line 24—24, Fig. 25 is a side elevation of the parts shown in Fig. 23, Fig. 26 is a horizontal, sectional view to an enlarged scale, of a part of the construction illustrated in Fig. 8, taken along the line 26—26, and shows one of the riffle boxes employed to collect and retain the fine metal particles, electrical connections and electrodes not shown in Fig. 8, being illustrated in this figure, which may be used, if desired, to electrically charge the metal particles flowing through the riffle box, Fig. 27 is a vertical, sectional view to a further enlarged scale, of a part of the construction illustrated in Fig. 26, illustrating a means that may be employed to supply fresh water to any of the riffle boxes, Fig. 28 shows in vertical, sectional view to a scale larger than that used in Fig. 15, a portion of one of the riffle blocks, to illustrate the action upon the mercury, of the water flowing over the riffle block, Fig. 29 is a plan view to an enlarged scale, of the end portion of one of the control tanks illustrated in Fig. 1, which is remote from the main sluiceway, and troughs for directing the overflow from said control tank to special sluiceways for recovering the fine metal particles not previously collected, and particularly the fine particles of rare metals, Fig. 30 shows in plan view to a further enlarged scale, the admission end of the special sluiceways illustrated in Fig. 29, Fig. 31 is a vertical, sectional view to a still further enlarged scale, of the construction of one of the special sluiceways illustrated in Fig. 30, taken along the line 31—31, Fig. 32 shows in plan view and to an enlarged scale, a portion of one of the grids employed in the riffle boxes illustrated in Fig. 17, Fig. 33 is a vertical, sectional view of the structure illustrated in Fig. 32, taken along the line 33—33, Fig. 34 shows in bottom view and to a scale larger than that used in Fig. 17, an adjustable gate for controlling the amount of flow of water and particles of minerals and metals, to each of the riffle boxes illustrated in Fig. 18, this view being taken along the line 34—34 in Fig. 17, the associated transverse trough being removed, Fig. 35 is a vertical, sectional view to a scale larger than that used in Fig. 26, of the construction illustrated in Fig. 26, taken along the line 35—35, Fig. 36 is a vertical, sectional view to a further enlarged scale, of a part of the construction shown in Fig. 35 taken along the line 36—36, Fig. 37 illustrates in plan view, a part of one of the distributing troughs shown in Fig. 9, Fig. 38 is a side elevation of the parts shown in Fig. 37, Fig. 39 shows in a view similar to Fig. 13, a modified construction of riffle block, Fig. 40 is a lower edge view of the riffle block illustrated in Fig. 39, Fig. 41 illustrates in plan view a locking rod for use in holding in place, riffle blocks of the construction illustrated in Figs. 39 and 40, Fig. 42 illustrates in plan view and to an enlarged scale, a part of the riffle box construction illustrated in Fig. 17, this view being taken along the line 42—42 in Fig. 17, Fig. 43 is a vertical, sectional view to a further enlarged scale, of a part of the construction shown in Fig. 42, taken along the line 43—43, Fig. 44 illustrates in a view similar to Fig. 11, a construction similar to that shown in that figure, provided with a modified structure for receiving the impact of mineral pieces dropping upon it, and Fig. 45 is a vertical, sectional view of the parts illustrated in Fig. 44, taken along the line 45—45.

Similar numerals refer to similar parts throughout the several views.

In Fig. 1, I illustrate the main sluiceway of a placer mining system at 10, provided with walks 11 and 12 along its sides. For convenient reference, the main sliceway is divided into sections A to L, the section A being at the upper end of the sluiceway receiving the water and mineral from the mineral body, and the section L being at the lower or discharge end of the sluiceway. The sections A, B and C are involved in the treatment of coarse metal particles, the sections D, E, F, G, H, and J are involved in the treatment of medium metal particles, the section K is a connecting section, and the section L includes at its lower end, a roller grizzly for diverting the water and fine metal particles to the control tanks 13 and 14.

Each of the control tanks 13 and 14 is provided with discharge pipes 15 and 16 extending downwardly from its bottom wall, which carry water and metal particles from the control tank to riffle boxes 17 and 18, the riffle boxes 17 not being shown in Fig. 1, since they are below the corresponding riffle boxes 18. The control tank 13 is provided with gutters 19 and 20 along its sides, for receiving the overflow from the tank, and the control tank 14 is provided with similar gutters 21 and 22. The gutters 19 and 20, as more clearly shown in Fig. 29, deliver their contents to troughs 23 and 24 which in turn deliver the water and metal particles to special sluiceways 25 and 26. The gutters 21 and 22 similarly deliver their contents to special sluiceways 25a and 26a corresponding to the sluiceways 25 and 26.

It will be noted that a plurality of riffle boxes 18 are shown for each of the control tanks, representing different sections of treatment of material delivered from the control tanks, these sections being numbered for convenience from I-XII for each control tank. As a result, the water and metal particles delivered to each control tank are subdivided, and flow to the several treatment sections, and on account of the number of treatment sections employed, the flow is of sufficiently reduced rapidity so that the material may be effectively treated in each of the riffle boxes 17 and 18.

Spouts 27 and 28 direct the water and material carried thereby, from below the roller grizzly 29, to distributing troughs 27a and 28a respectively over the control tanks 13 and 14, which deliver said water and material to the control tanks 13 and 14, and a trough 30 directs the water and material carried by it, remaining from the treatment of material in sections D to J of the main sluiceway, to a chute below the grizzly 29, for delivery to the spouts 27 and 28 as described below.

As illustrated in Figs. 2 and 3, each of the treatment sections A, B and C of the sluiceway 10 is provided adjacent its upper end, with a stationary grizzly 31 in the bottom of the sluiceway, from which the said bottom continues downwardly in the form of transverse metal plates 32, to a more sharply inclined metal delivery plate 33 which directs the water and mineral matter carried by it, upon the upper portion of the bottom of the main sluiceway at the upper end of the next treatment section. Each delivery plate 33 delivers the material flowing upon it, over a metal bar 49 which is sufficiently above the bottom of the sluiceway below it, to permit the water and mineral delivered from any one of the sections of treatment, to flow below said bar to the next stationary grizzly 31, or from the last of said treatment sections, to the first of the next succeeding treatment sections, D, as the case may be.

As illustrated in Figs. 3 and 11, the bottom plates 32 of each of the treatment sections, A, B and C, has located beneath it, a riffle box 34 to receive the water and mineral delivered through the corresponding grizzly 31, and to treat the coarse metal particles in a manner to be described, and to deliver the water and remaining mineral to the next section of the sluiceway 10. Each of the riffle boxes 34 is provided with a pipe 35 for supplying fresh water to the riffle box as may be desired.

In Fig. 4 I illustrate the relation of the walks 11 and 12 to the main sluiceway 10, and the relation of each of the riffle boxes 34 to the bottom of the main sluiceway. The side walls of the main sluiceway 10, the walks 11 and 12 and the supporting members for the various parts referred to, are preferably of wood, to facilitate the construction of the parts of the system and to make the structure relatively inexpensive.

From the operation described in general, it will be observed that pieces of mineral of small enough size to pass through each of the grizzlies 31, including the coarse metal particles, and a part of the water flowing through the main sluiceway 10, are diverted or by-passed from the main flow in the sluiceway, for treatment of the coarse metal particles in the corresponding riffle box 34, and that this is repeated as many times as may be necessary or desirable, to effect a high percentage of recovery of the coarse metal particles, the unretained metal and mineral in each case flowing with the diverted water, and with the fresh water if it is added, to the next treatment section, and finally from the last treatment section C to the first treatment section D of the next stage of treatment to which the mineral is subjected.

As illustrated in Figs. 5, 6, 16 and 17 the bottom of the main sluiceway 10 for the treatment sections D to K, and for the first part of the section L, consists of transverse metal plates 36, provided with restricted passageways around their edges, in a manner to be described, to permit a small amount of water flow from the sluiceway 10 around the edges of each of said plates, carrying with it medium metal particles, which diverted water and metal particles are received by a riffle trough 37 below the sluiceway, said trough having buck boards or partitions 38 across it at intervals corresponding with the lengths of the treatment sections E to J, so that the medium metal particles collected between any two adjacent partitions 38, or above the uppermost one of said partitions, are directed from just above each partition 38, through a trough 39 into a riffle box 40 for treatment therein in a manner to be described, each of said riffle boxes delivering therefrom the water and mineral not retained by said riffle box, into a riffle drain 41. A pipe 42 is provided for each of the riffle sections of the trough 37, to supply fresh water thereto as may be desired, and each of the riffle boxes 40 is provided with a pipe 43 for supplying fresh water thereto, as may be desired to produce most effective results in said riffle box.

As illustrated in Fig. 7, the trough 37 is below the bottom plates 36 of the main sluiceway 10, and the riffle boxes 40 and also the riffle drain 41, are below the walk 11, and each trough 39 extends laterally through the side wall of the housing of the main sluiceway 10, to deliver water and mineral from the corresponding section of the trough 37, to one of the riffle boxes 40. The riffle drain 41 extends to the lower end of the walk 11, where it delivers the water flowing in it and the mineral carried thereby, into the trough 30 shown in Fig. 1.

The several sections of the trough 37 are provided with means for collecting and retaining fine metal particles in a manner to be described, so that said trough sections besides supplying the riffle boxes 40 with material for treatment, also constitute riffle boxes.

In Figs. 10, 11 and 12, I illustrate one way in which each of the treatment sections A, B and C of the main sluiceway 10 may be constructed.

In Fig. 10, the same parts of the sluiceway are illustrated as shown in Fig. 2, excepting that they are to a larger scale. As shown in Fig. 11, the metal bottom plates 32 are supported on longitudinally extending planks 44, which in turn are supported by cross beams 45, the ends of which rest in flanged metal brackets 46 carried by the side walls of the sluiceway. The delivery plate 33 is similarly supported, excepting that its lower edge is carried directly by flanged metal brackets 47 carried by the side walls of the main sluiceway, to reduce the over-all height of the structure. Each of the grizzlies 31 consists of transverse metal bars separated by amounts corresponding to the size of the coarse metal particles to be permitted to pass through the grizzly, and just above each of the grizzlies 31 except the grizzly adjacent the extreme upper end of the sluiceway, the bottom of the sluiceway is covered, for example, with a thick sheet of rubber 48, to cushion the impact on the bottom of the main sluiceway, of heavy pieces of mineral that may drop from the next upper sluiceway section. To facilitate replacement due to wear, a transverse metal bar 49 is preferably carried by the brackets 47 immediately below the lower edge of each delivery plate 33, so that renewals may be more readily made than if it were required to renew the entire delivery plate 33, and furthermore the bar 49 may be made of hard metal, for example, manganese steel, if desired, without incurring the expense that would be involved if the entire delivery plate 33 were made of such metal, although, if preferred, the plates 33 may be made of such material and the bars 49 may be omitted.

The riffle box 34 illustrated in Fig. 11, consists of longitudinally extending planks 50 supported by suitable wooden cross beams, and on the planks, a plurality of riffle blocks 51 are mounted, the upper end of the riffle box 34, just above the uppermost riffle blocks 51, being provided with a sand box 52 to receive the water and mineral delivered to the riffle box through the grizzly 31, and to avoid the undue wear that otherwise would result from the pieces of mineral striking the upper portion of the bottom of the riffle box. The riffle blocks 51 are preferably constructed as will be described, to contain mercury for amalgamating the coarse metal particles which pass downwardly on said riffle blocks towards the next section of the bottom of the sluiceway. At the lower end of each riffle box 34, a metal sump 53 is provided, to catch and retain any of the mercury that may be displaced from the riffle blocks 51. The riffle blocks 51 are so made that the mercury is not readily displaced from them during their operation, and the sumps 53 are provided as a precautionary measure, to insure that any mercury that may be accidentally dislodged from said blocks, will not be lost. Below each sump 53, a metal plate 54 constitutes the upper part of the next section of the bottom of the main sluiceway 10, which metal plate extends down to the upper edge of the rubber plate 48, the latter being under the lower edge of the bar 49, or substantially so.

In Figs. 44 and 45, I illustrate a different construction for receiving the impact and wear of large size pieces of mineral dropping from the lower end of each of the sluiceway sections A, B and C. In this construction, instead of the rubber sheet 48, I place a plurality of short lengths of steel rails 48a, longitudinally of a lower one of the sluiceway sections and at the upper end of said section, under the lower end of the next upper one of the sections A, B and C, said rails being preferably placed as close together as their flanges will permit, and covering the entire width of the sluiceway. The rails receive the impacts of pieces of mineral dropping upon them from the next upper sluiceway section, and transfer said impacts to the supporting planks and timbers of the sluiceway structure, and the spaces between the heads and webs of said rails, provide passages for the free flow of water and mineral from the riffle boxes respectively delivering material to them. The rails are readily renewable when worn and are inexpensive to install and maintain, since used rails which are too badly worn to be used for track work, are quite satisfactory for this purpose.

As illustrated in Fig. 12, the riffle blocks 51 are preferably of relatively small size, for convenience in manufacture and handling, whereas the width of the main sluiceway 10 and of the riffle box 34 below it, may be relatively large, requiring a plurality of riffle blocks to complete the width of the covering of the bottom of the riffle box. In view of this, and of the further fact that the length of the riffle box requires a plurality of transverse rows of said riffle blocks to cover its bottom, it is desirable that the longitudinal joints between the riffle blocks shall be broken for successive transverse rows thereof, and to facilitate this, I employ half blocks, as indicated, at the ends of intermediate ones of said transverse rows of blocks, the corresponding end blocks of the alternate rows of said riffle blocks being full size blocks.

In the stage of treatment illustrated by sections A, B and C, it will be observed that a part of the water flowing in the main sluiceway, is diverted therefrom for each of said treatment sections, but that the water so diverted for any of said treatment sections, is returned to the sluiceway before the next of said diversions from the sluiceway is effected. This is important where large size pieces of mineral or other solid material must be moved by the water flowing in the sluiceway. In such cases, a certain minimum amount of flow is necessary, in order to effectively move the solid matter in the sluiceway, and any permanent diversion of a substantial amount of water from the sluiceway, results either in leaving too little water in the sluiceway to effectively move the solid matter therein, or in requiring an excessive amount of water to be supplied to the upper end of the sluiceway, and excessive flow above the point of permanent diversion. By my invention, the flow in the sluiceway is not seriously decreased by the diversion through the grizzlies 31, since said decrease is no greater at any point in the sluiceway than that produced by the diversion through one of the grizzlies 31, which may readily be adjusted to suit the requirements of any particular case, by using a corresponding number of bars in said grizzly, the said diversion being proportional to the number of bars used in the corresponding grizzly. Furthermore, the return of the diverted water to the sluiceway after each diversion and before a succeeding diversion is effected, results in reestablishing full, normal flow in the sluiceway after each of said diversions. I thus secure the advantages of diversion from the sluiceway, without involving the system in disadvantages, said advantages being that the sluiceway may be constructed entirely for the purpose of effectively moving solid material in it, for example, it may have a greater slope than it could have if metal recovering operations were effected in it, that the devices provided for handling the diverted flow may be constructed entirely for the purpose of effectively recovering metal particles from the diverted material, and that the metal recovering means may be enclosed and rendered inaccessible while the sluiceway is in operation.

In Figs. 13, 14 and 15, I illustrate one manner in which I may construct the riffle blocks 51 referred to. Each riffle block 51 is preferably square or rectangular, and is provided with a plurality of parallel grooves 51a extending nearly from the top edge to the bottom edge across the top surface of the block, as illustrated in Fig. 13, so that each groove may contain mercury for amalgamation purposes, independently of the other grooves and independently of the other riffle blocks. As illustrated in Fig. 15, each of the grooves 51a has a depth substantially more than half the thickness of the block 51, and is provided on the side against which the flowing water strikes, with a sharp edge 51b from which the groove is provided with a cylindrical, concave wall to the bottom of the groove, so that the edge 51b extends over a part of the groove, the remaining wall of the groove being convex and gradually merging with the top surface of the block 51, so that the upper part of the groove is substantially wider than its lower part. The block 51 may be provided on two of its outer edges, with grooves 51c and on its other edges with corresponding tongues 51d, so that when the riffle blocks are assembled on the bottom of a riffle box, as illustrated in Fig. 12, the tongues and grooves of adjacent blocks interengage each other. The blocks 51 may be made of any material that will effectively hold mercury, for example, cast iron or rubber, an important consideration being that the material shall be inexpensive on account of the large number of blocks used in the system.

In Figs. 13 and 15, I illustrate metal studs 51e extending through the block 51, in line with the grooves 51a, to permit electrical connection with the mercury in the grooves, when the blocks are made of rubber, or of other material that is a non-conductor of electricity, and when it is desired to electrically charge the metallic particles flowing over the riffle block. I find this practice is desirable in cases where the mineral contains rare metals which do not readily amalgamate with mercury unless electrically charged. Where the blocks are made of rubber, they are preferably made in molds, and the studs 51e may either be molded in place in the blocks, or corresponding holes may be formed in the blocks, and the studs may be inserted after the blocks are molded. Where the latter practice is followed, it is desirable to provide the studs with flanges and thin heads as shown, or the equivalent, to positively hold the studs in proper position after they are inserted, and to seal the holes through the blocks, so that there will be no mercury leakage and that the lower ends of the studs as shown in Fig. 15, may readily make electrical contact with a metal connector or connectors.

In Figs. 39 and 40, I illustrate a construction of riffle block 151 for the same purpose and operating in the same manner as the riffle block 51, but having a different construction for interlocking the edges of the blocks while they are in use. The edges of the blocks are provided with grooves 151c, which may extend entirely around them, or be formed only in their opposite edges, as desired, and when these blocks are in use, they may be held in place by rods 152 of suitable material, for example iron or steel, illustrated in Fig. 41, in the aligned grooves of adjacent blocks. It will be understood that the edge interlocking constructions illustrated in Figs. 13 and 14 and in Figs. 39 and 40 may be used as shown, or in any desired combination, and that different arrangements of the blocks may be employed, as desired, to suit the requirements of different cases.

In Figs. 16 and 17, I illustrate the relation of the bottom plates 36 of the main sluiceway 10, to each other, and the location of the troughs 39 below said plates and the walk 11. As shown in Fig. 16, the plates 36 are separated by intermediate supporting bars 55, provided as indicated in Fig. 17, along their lower edges with outwardly extending flanges, each of the bars 55 being provided as indicated in Fig. 16 at its ends, with a bent metal spacing member 56, to slightly separate the plates 36 from the supporting bars 55, excepting at their end portions. The construction of the spacing members 56 is more clearly shown in Fig. 21, where one of said members is illustrated in perspective view, and in Figs. 19 and 20, where one of said members 56 is shown in place on the end of one of the supporting bars 55 in position to support the corresponding end portions of the adjacent plates 36. Each of the supporting bars 55 may be provided with a groove 55a in its upper surface, similar in form to the grooves 51a formed in the riffle blocks 51, to contain mercury and constitute a riffle bar across the bottom of the main sluiceway to engage and retain such particles of metal susceptible of amalgamation, as come in contact with said mercury. The riffle grooves in the bars 55, may be employed or not, as desired, depending upon the conditions under which the structure is used.

From the construction just described, it will appear that a restricted passageway is provided between each of the supporting bars 55 and each adjacent bottom plate 36, the thickness of this passageway depending upon the thickness of the sheet metal from which the bent spacing members 56 are constructed.

The bars 55 may be supported at their ends from the side walls of the sluiceway 10, by bars or brackets not shown, permitting the ready removal of said bars for the purpose below described, for example, by brackets like the brackets 47 above described.

It is to be borne in mind, that by the time the mineral carried by the water in the main sluiceway, passes over the lower portions thereof, represented by sections D to L inclusive, the coarse metal particles susceptible of amalgamation, have been removed by the preceding treatments illustrated and described for sections A, B and C of the main sluiceway, and that only the medium and fine metal particles are carried through the remaining sections of the sluiceway. It will be observed that the main sluiceway is provided for a considerable length, with a bottom construction as illustrated in Figs. 16 and 17, so that the medium metal particles have opportunity to settle through the water flowing in the sluiceway, even though the flow may be rapid, which is usually the case in operations of the kind under consideration, and as a result, the medium metal particles find their way into the passageways between the supporting bars 55 and the bottom plates 36, and are carried by the water diverted through said passageways, into the trough 37 located as above described, below the sections D to J inclusive, said trough being illustrated in Fig. 17, to a larger scale than that used in Fig. 6.

As illustrated in Fig. 17, each section of the trough 37, immediately above the corresponding buck-board or partition 38, is provided with a hopper or sump 57 to receive the material delivered by the corresponding section of the trough 37, which hopper or sump is provided with an outlet 58 having a movable gate 59 to control the rate of flow of the delivered material, into the corresponding trough 39. The construction and operation of the gate 59 are more clearly illustrated in Fig. 34 showing one of the gates 59 in bottom view. As shown in Fig. 34, the gate is secured in place on the lower end of the outlet connection 58, by means of a pivot screw 60 so that it may be turned to more or less completely open the outlet connection 58, and the portion of the gate opposite to the screw 60, is preferably extended and provided with an aperture 61 for convenient engagement with an operating rod that may be run through the corresponding trough 39 to engage and move the gate to establish the rate of flow desired in the trough 39.

As shown in Figs. 17, 42 and 43, each section of the trough 37, above its hopper or sump 57, is provided on its bottom with a layer of porous material 137, for example moss, held in place by a screen 138, preferably of metal wire. The screen supports a grid 139 of thin metal plates 139a and 139b, which, as more clearly shown in Figs. 32 and 33, are in vertical planes crossing each other, to form compartments which are open at their upper and lower ends. Said compartments fill with sand and fine mineral matter which seep through the restricted passageways in the bottom of the sluiceway 10 above the trough 37, with the water and medium and fine metal particles diverted from the sluiceway flow. The diverted metal particles are thus directed downwardly by the diverted water, against the sand and mineral in the grid compartments, and a considerable part of the fine metal particles, is carried by the water through the sand and into the porous material 137, which retains much of said fine metal particles so brought into engagement with it. The porous material is removed from time to time, and the fine metal particles of value collected and retained by it, are recovered by any convenient means known to the art, and adapted to the purpose. The several sections of the trough 37 thus constitute in effect, riffle boxes which collect and retain part of the metal particles delivered to them, and particularly the fine particles of heavy rare metals, and at the same time they deliver for subsequent treatment, the lighter metal particles they are not adapted to collect and retain. Thus these riffle boxes constitute separators operated by the specific gravity of the metal particles delivered to them. The lighter metal particles are carried from said riffle boxes by the water flowing through them, and are delivered to the troughs 39.

The plates 36 and the bars 55 constitute in effect a plate grizzly which is particularly effective for the purpose described, on account of it being impracticable to accurately fit the plates to the bars without prohibitive expense. This inaccuracy results in vibration or slight rocking of the plates on the bars, due to the material passing over them, which keeps the restricted passageways between the plates and the bars clear of obstructions, even though the sand and fine material may tend to pack in said passageways and clog them.

As illustrated in Fig. 18, each of the riffle boxes 40 is provided with a bottom of planks on which riffle blocks 51 are placed, which riffle blocks are preferably constructed and operate as above described. The manner of placing the riffle blocks 51 in the riffle boxes 40, is illustrated in plan view in Fig. 22, the riffle boxes 40 being narrower than the riffle boxes 34, on account of being located under the walk 11, and there being preferably a greater number of them than there are of the riffle boxes 34. The metal particles finding their way through the restricted passageways between the bottom plates and supporting bars of sections D to J of the main sluiceway 10, which are not retained in the trough 37, are effectively brought into engagement with the mercury in the riffle blocks of the riffle boxes 40 and insofar as they are susceptible of amalgamation, they are efficiently retained thereby, as a result of the subdivision of the trough 37, and the control of the rate of flow through the troughs 39, it being desirable that each section of the trough 37 shall be no larger in any case, than to deliver the quantity of metal particles that can be efficiently treated in one of the riffle boxes 40, there being one of said riffle boxes for each section of the trough 37.

As illustrated in Figs. 23 and 24, the roller grizzly 29 preferably consists of a plurality of rollers, each comprising alternate rubber disks 62 separated and spaced by smaller intermediate disks 63 said disks being mounted on a shaft 64 for rotation by suitable gearing 65 by the drive shaft 66 of the grizzly, for example by means of a sprocket or gear wheel 67 from any suitable source of power, not shown. The rollers are all rotated in the same direction, as indicated in Fig. 24, by the gearing 65, so that the upper surfaces of the rollers move in the direction of flow of the water and mineral over the grizzly, indicated by the arrow 68 in Fig. 24. As illustrated in Fig. 24, cleaning fingers 69 of suitable metal are preferably mounted in the grooves between the larger disks 62, to prevent the mineral matter from packing in the grooves and interfering with the operation of the grizzly. The gearing 65 is illustrated in Fig. 25. The rollers are spaced from each other, and the disks 63 are of a thickness and diameter relatively to the disks 62, to provide clearance spaces between the rollers permitting pieces of mineral of desired size to pass downwardly between the rollers. The resilient nature of the rubber disks 62, permits pieces of slight oversize to pass between the rollers without clogging the device, whereas large pieces of mineral matter are carried over the grizzly and delivered from its tail end to the dump pile. The large number of clearance spaces between the rollers of the grizzly for mineral matter of desired size, permits the ready flow through the grizzly of substantially all of the water delivered to the grizzly from the sluice-way 10, so that the metal particles that are not diverted through the passageways in the bottom of sections D to J of the main sluiceway 10, are diverted with the water stream through the grizzly for subsequent treatment.

As illustrated in Fig. 8, the roller grizzly 29 is preferably mounted at its upper end on a pivotal support 70, the lower end of the grizzly being supported by jack screws 71 so that the grizzly may be given different desired inclinations, depending upon the quantity of water flowing and the nature of the mineral matter carried by the water. Below the grizzly 29, a shaking screen 72 is mounted in any convenient manner, for example, by links 73, so that the screen may be shaken longitudinally by any convenient means, for example, by a connecting rod 74 extending from the upper end of the screen 72 to a crank 75 carried by a shaft 76 rotated as desired by means of any suitable source of power not shown. The screen 72 is of a mesh to permit the pieces of metal and mineral of desired size for subsequent treatment, to pass through it, and serves to catch any oversize pieces that may pass through the grizzly 29, and deliver them from the tail end of the screen to the dump pile.

While the screen 72 illustrated, is of the shaking or reciprocating type, it will be understood that any known type or kind of screen may be employed for this purpose, that will receive the material delivered through the roller grizzly 29, and remove from it desired over-size pieces of material.

Below the grizzly 29 and the screen 72, a first chute 77 is located, to receive all of the water, metal particles and mineral matter that pass through the screen 72, and direct them into the upper end of a second chute 78 extending under the lower end of the main sluiceway 10, to deliver its contents into the upper end of a third chute 79, which, as more clearly shown in Fig. 9, is divided at its lower portion to form the spouts 27 and 28 for delivering material received by the chute 79, to the distributing troughs 27a and 28a and from them to the control tanks 13 and 14. At the upper ends of the spouts 27 and 28, a gate 80 is pivotally mounted at its lower edge, so that when it has the position shown in full lines in Fig. 9, all of the water, metal particles and mineral delivered to the chute 79, are directed into the spout 27 and thus to the distributing trough 27a and by it to the control tank 13, whereas when the gate 80 is moved to its position indicated by dotted lines in Fig. 9 at 80a, all of the material delivered to the chute 79, is directed by the gate 80 to the distributing trough 28a and by it to the control tank 14. Under some conditions, it is desirable to divide the material delivered to the chute 79 and direct part of it to each of the distributing troughs and this is readily accomplished by placing the gate 80 in an intermediate position, as indicated in Fig. 9 by dotted lines at 80b.

The gate 80 thus affords a convenient means for using either control tank while the other is out of use, for example, while cleaning out the riffle boxes supplied with material from the latter tank, the capacity of each tank being preferably sufficient to take care of all of the material delivered to the chute 78, for normal or ordinary flow in the sluiceway 10, for example, while the mineral matter is being washed from its natural deposit; at times said flow is materially increased, for example, in washing out pockets above the upper end of the sluiceway in which water has collected, producing a condition of "double heading", and when this occurs, the increased flow is effectively taken care of, by moving the gate 80 to a mid-position so that each control tank will receive a part of the material then delivered to the chute 78 without over loading either tank.

The relation of the delivery end of the trough 30 to the chute 78 is illustrated in Figs. 8 and 9, and this provides for delivering all of the water, metal particles and mineral flowing from the riffle drain 41 into the chute 78 and thus to one or both of the control tanks.

The control tanks 13 and 14 are of the same construction and operate in the same manner to control the several treatments in the riffle boxes of sections I to XII above referred to, so it is necessary to describe but one of said control tanks, for example the tank 13. As shown in Fig. 8, the tank 13 is provided with a bottom wall having two substantially level portions 13a and 13b adjacent its side walls and of the same width, and inclined portions 13c and 13d extending upwardly and towards each other, from the inner edges of the portions 13a and 13b, and meeting in a longitudinal line centrally disposed beneath the trough 27a, the common upper edge of the portions 13c and 13d, being below the water level in the tank 13, and the portions 13c and 13d constituting in effect a longitudinal partition in the tank.

As indicated in Fig. 9, and more clearly illustrated in Figs. 37 and 38, the distributing troughs are provided with gates at desired intervals, to discharge their contents into the corresponding control tanks, and since said distributing troughs are of the same construction, it is necessary to illustrate but one of them, for example, the distributing trough 28a shown in Figs. 37 and 38. As there shown, the trough 28a is provided in both of its side walls and throughout its length, with outlet openings 28b, and a gate 28c for each of said openings, mounted in suitable guideways for vertical movement to close or open the corresponding outlet openings as desired. Each gate 28c may be held in any desired position by any suitable means, for example by a pin 28d extending through it, a plurality of holes 28e being preferably provided through the gate, to receive said pin for different desired amount of opening of said gate.

The distributing trough 28a extends longitudinally of the tank 14 and centrally above it, and as a result, the outlet openings in one side wall of said distributing trough and the gates associated therewith, control the delivery and distribution of water, metal particles and mineral, to the corresponding side portion of said tank, and the outlet openings in the other side wall of said distributing trough and the gates associated therewith, control the delivery and distribution of said material, to the other side portion of said tank, thereby providing for any desired distribution of said material to all parts of said tank.

It will be understood that the outlet openings 28b and the gates 28c are illustrative only, and that any known type or kind of such devices may be employed, as desired.

Similarly, the water and the material carried thereby which are delivered by the trough 27a to the tank 13, may be divided so that substantially half thereof is delivered above the bottom wall portion 13a, and the other half above the bottom wall portion 13b, so that the metal particles and mineral matter may be divided into two substantially equal parts in the control tank 13 for the subsequent treatments controlled by the control tank, and further, that the metal particles and mineral delivered to each side portion of the control tank, may be distributed with substantial uniformity, throughout the length of the control tank, to provide for supplying substantially the same amount of material to each of the outlet pipes 15 and 16, if desired, or any other distribution of said material, as may be preferred under some conditions.

The relation of the gutters 19 and 20 to the control tank 13, is illustrated in Fig. 8, the side walls of the control tank being somewhat lower than the outer side walls of the gutters 19 and 20, so that the water and the fine metal particles carried thereby, which flow over the side walls of the tank 13, are caught by the gutters 19 and 20 and directed to the sluiceways 25 and 26. The control tank 13 is practically level throughout its length to facilitate the delivery of the fine metal particles and mineral matter to the several riffle boxes 17 and 18 supplied from the tank 13. To insure flow in the gutters 19 and 20 to their delivery ends, they are of gradually increasing depth from adjacent the spout 27, to the remote end of the tank, the relation of the gutter 20 to the tank 13 adjacent the delivery end of the gutter 20, being illustrated in Fig. 8a.

As shown in Fig. 8, each of the pipes 15 and 16 may be closed, as desired, by inserting in its upper end a plug 110, provided with a handle 111 extending above the water level in the tank 13, for convenient operation of the plug when the tank is in use. This permits shutting off the supply of material to individual ones of the riffle boxes 17 and 18 as desired, for example, to clean out said boxes. It will be understood that there is little flow in the tank 13, and as a result, sludge accumulates therein to a considerable degree. To insure against the sludge clogging flow to and through the outlet pipes 15 and 16, each of said outlet pipes is preferably provided in the tank 13, with a clearing pipe 112, open at its upper and lower ends, and perforated at 112a above the sludge line in the tank, said clearing pipe being vertically supported so that its lower end is near and directed towards the upper end of the corresponding outlet pipe. When the upper end of any one of the outlet pipes tends to clog with sludge, the relatively clear water delivered from the corresponding clearing pipe 112, breaks up and thins the sludge, and causes it to flow to and through the outlet pipe.

The pipes 16 of each of the treatment sections I to XII, deliver water and metal and mineral particles from above the bottom portion 13b of the tank 13, to one of the riffle boxes 18 as illustrated in Fig. 8, and the pipes 15 deliver water and metal and mineral particles from above the bottom portion 13a of the tank 13, to spouts 81 which in turn deliver the materials received from the pipes 15, to one of the riffle boxes 17, the riffle boxes 17 and 18 being of the same construction, and each riffle box 18 being located above a corresponding riffle box 17, but extending horizontally beyond the delivery end of the riffle box 17, to insure that the waste matter delivered from any riffle box 18, will not find its way into the corresponding riffle box 17. Each of the riffle boxes 18 is provided adjacent its delivery end, with a sump 82 for collecting metal particles and mineral matter not otherwise retained by the action of the riffle box, so that the sump may be cleaned out from time to time, and such further treatment given the removed metal and mineral particles as may be desired. Each of the riffle boxes 17 is similarly provided with a sump 83 and for the same purposes. The riffle boxes 17 and 18 are respectively provided with water pipes 84 and 85 for supplying fresh water as may be desired to said riffle boxes, in addition to the water delivered to them from the control tank 13, to produce desired action and flow of the material in the riffle boxes.

The riffle boxes 17 and 18 are of the same construction and operate in the same manner, and it is therefore necessary to describe but one of them, for example, the riffle box 18 which is shown in plan view in Fig. 26. As indicated in this figure, the riffle box is provided with riffle blocks 51 of the construction illustrated in Figs. 13, 14 and 15, or blocks 151 of the kind shown in Figs. 39 and 40 may be used if preferred, so that the metal particles flowing through the riffle box may be amalgamated by the mercury contained in the grooves in the riffle blocks. Bearing in mind that the material delivered to the riffle box 18 may consist in part of fine particles of rare metals, such as iridium, palladium, platinum, ruthenium and osmiridium, and that these rare metals do not readily amalgamate with mercury, I find it desirable to provide means in connection with each of the riffle boxes 17 and 18, to electrically charge the metal particles flowing through the riffle box, since I find by so doing that particles of some of the metals which otherwise would not freely amalgamate with the mercury, are caused to do so. To effect the electrical charging of the metal particles in the riffle boxes 17 and 18, I provide each of them, as illustrated in Fig. 26, with electrodes or anode bars 86 which may conveniently be connected together in sections by transverse metal bars 87 from which supporting studs 88 extend upwardly through and are insulated from supporting cross pieces 89, so that the bars 86 are held above and near the upper surfaces of the riffle blocks. The studs 88 are preferably connected with a positive conductor 90 extending to a suitable source of current supply, not shown, to deliver the requisite voltage and current to charge the metal particles passing through the riffle box 18. With this arrangement, the riffle blocks 51 are preferably provided with metal studs 51e as above described, to make contact with the mercury in the grooves in the riffle blocks and so constitute the mercury, the other electrode or cathode of the electric circuit. To make convenient electrical connection with the studs 51e, and yet permit the riffle blocks to be handled separately as is desirable in cleaning the amalgam from them, the bottom of the riffle box 18 may carry a thin metal connector or connectors 91 as illustrated in Figs. 35 and 36, on which connector or connectors the riffle blocks 51 are placed, the studs 51e having a relation with the bottom surfaces of the riffle blocks to make electrical contact with the connector or connectors when the riffle blocks are placed thereon. The connector or connectors 91 are illustrated as of thin sheet metal, which may be in a single piece or a plurality of pieces as most convenient, connected with a plurality of insulated wires which in turn are preferably connected with the negative conductor 92 extending from the source of current supply used to produce current flow through the water as it flows over the riffle blocks. The riffle box 18 thus in effect is an electrolytic cell in which the current flows from the anode bars 86 to the cathode studs 51e, the tendency being, to carry the metal particles with the current flow and produce more intimate association between the metal particles and the mercury than would otherwise occur, as a result of which, combination takes place between the mercury and some of the rarer metal particles which would not occur without the electrical action described.

To facilitate removing the anode bars 86, for example to permit cleaning out the riffle blocks, each of the supporting bars 89 may be hinged to one side wall of the riffle box 18, as indicated at 89a in Fig. 35.

The anode bars and cathode studs illustrated in Figs. 26 and 35, may have any desired conformation and relation to each other and to the grooves in the riffle blocks, the construction and relation that I prefer to employ being illustrated in Fig. 36. As there shown, the anode bars 86 besides being held just above the upper surface of the riffle block 51, are considerably wider than they are thick and of wedge shaped cross section, so that their thin edges extend upstream of the water flowing in the direction of the arrow 93. This not only offers little restriction to the water flowing in the riffle box, but in addition, the inclined lower surface of each of the anode bars 86, diverts the water passing below it towards the riffle blocks 51, and increases the agitating effect of the water flow, on the mercury in the grooves in the riffle blocks. It is desirable that the trailing edges of the anode bars 86, be conformed as illustrated in Fig. 36, or the equivalent, to produce stream line flow, without forming eddy currents in the flowing water, which would retard its flow.

The electrical treatment of the metal particles, above described, is not required in all applications of my system, its use being desirable where certain of the metal particles treated, are of a kind, or in a condition that renders their amalgamation with mercury difficult or impossible without special treatment, and where electrically charging the metal particles, sufficiently changes these conditions to produce effective amalgamation of the metal particles. In some cases, the metal particles are covered with films or coatings, for example, oily films or coatings of iron oxide, which interfere with ready and efficient amalgamation, and in such cases, I find that the electric current flow described, breaks up the film or coating and facilities effective amalgamation of the metal particles. Where electrical treatment is employed, I find that direct current flow generally produces satisfactory results, although any kind of electric current may be used, that will best meet the requirements of any particular case.

Each of the pipes for supplying fresh water to the riffle boxes, is preferably constructed at its delivery end, as indicated in Fig. 27 for the pipe 85 supplying fresh water to the riffle box 18 illustrated in Fig. 26. As shown in Fig. 27, the pipe 85 extends through the upper end wall of the riffle box 18 and is then turned downwardly, and between its lower open end, and the bottom of the riffle box 18, a spreader plate 94 is supported in any convenient manner, for example by arms from the lower end of the pipe 85, so that the water issuing from the pipe 85 strikes the plate 94 and is spread over the entire upper end of the bottom of the riffle box 18.

The fresh water added to any of the riffle boxes as desired, and as above described, serves to break up the slime in said riffle box to produce effective flow therethrough, and results in the effective collecting and amalgamating of the metal particles in said riffle box.

Each fresh water supply pipe is preferably provided with a control valve as indicated in the drawings, so located in said supply pipe as to be conveniently accessible for operation, to the end that the fresh water supplied to the several riffle boxes may be individually controlled, according to the requirements for each of said riffle boxes.

As indicated in Fig. 27, the uppermost row of riffle blocks 51 is preferably sufficiently removed from the upper end of the riffle box, so that the water and mineral matter flowing into the box will not impinge directly upon said upper riffle blocks, and the space between said upper riffle blocks and the upper end of the riffle box may be filled with a block of suitable material 95, for example rubber, to absorb the impacts of the pieces of solid matter delivered into the riffle box and eliminate the wear that would otherwise occur, if the block 95 were made of non-resilient material.

The shape of the grooves 51a in the riffle blocks 51, described in connection with Fig. 15, results in the action of the water currents flowing over each riffle groove 51a, on the mercury in the riffle groove, which is generally illustrated in Fig. 28 for one of said riffle grooves. As shown in Fig. 28, the position normally assumed by the mercury in a riffle groove 51a is illustrated for the body of mercury 96, shown in full lines, which, as indicated, preferably has a depth less than half the depth of the groove. A stream of water flowing over the upper edge of the riffle groove 51a is illustrated at 97, and part of this water stream follows the surface of the riffle groove as indicated by the arrows at 97a, to engage the front side and lower surface of the mercury body 96, which tends to press the mercury body upwardly and also against the concave vertical surface of the riffle groove. At the same time, another part of the water stream takes the course indicated by the arrows 97b, above the mercury body 96 and just below the sharp upper edge 51b, and down the concave side wall of the riffle groove. The water flowing along the path indicated by the arrows 97b, is thus directed downwardly between the concave surface of the riffle groove and the adjacent side of the mercury body 96, so that the water pressures produced on the opposite sides of the mercury body, tend to decrease the width of the mercury body in the riffle groove 51a, and cause it to assume a distorted form indicated in dotted lines at 96a. It will be understood that the water flow over the riffle block 51 is not uniform or constant, due to pieces of mineral carried by the water stream causing variations in the flow and corresponding pulsating effects of the water streams on the mercury body 96. The result of this is a pulsating action of the mercury body 96, in the direction indicated by the arrow 98. This continual agitation of the mercury body breaks up the surface film on the mercury and cleans it, and results in intimate contact between the mercury and any metal particles carried by the water stream against the mercury, so that most effective amalgamation results, of all the metal particles that are susceptible of amalgamation. This effect takes place whether the cathode studs 51e illustrated in Figs. 26, 35 and 36, are employed or not.

In Fig. 30 I illustrate in plan view, the upper portion of the sluiceways 25 and 26, these sluiceways being of the same construction throughout their entire extent from adjacent their upper ends to their delivery ends. Each of these sluiceways, as illustrated for the sluiceway 25 in Fig. 31, consists of side and bottom walls of wood, held in place by suitable main frame members 99, 100 and 101, it being understood that each set of main frame members holds the walls of the two sluiceways 25 and 26 in place, there being a common vertical wall 109 between said sluiceways. As illustrated in Fig. 31, the bottom wall of the sluiceway 25 is covered by a layer of porous material 102, for example moss, on which a metal screen 103 is laid to keep the moss in place. Adjacent the side walls of the sluiceway, layers of porous material 104 and 105, for example moss, are placed and held against said side walls, by metal screens 106 and 107. Riffle bar frames 108 are placed against the screens 103, 106 and 107 at short intervals to hold the screens in place and to produce eddy currents in the flow through the sluiceway to cause flow of the water and the fine metal particles carried thereby, through the screens and into the moss layers. The riffle bar frames 108 may be held in place by the corresponding ones of the main frame members 101, or by any other means as desired, depending upon whether the same number of main frames is employed, as riffle bar frames.

The moss is sufficiently porous so that the water and the fine metal particles carried by it, flow freely through it, and at the same time the minute leaves of the moss engage and effectively retain the fine metal particles coming into contact with them, which may in large part, consist of the rare metals above referred to, or other metals if they are present, since the fine gold particles have already been largely, if not entirely removed. When the moss has received all of the metal particles it can effectively retain, it is removed from the sluiceway 25 by first removing the riffle bar frames 108, after which the screens 106 and 107 are removed, the moss layers 104 and 105 are removed, then the screen 103 is removed and the moss layer 102 is removed. Then the sluiceway structure is rebuilt as described, with fresh moss ready for further operation, and the valuable metal particles contained in the removed moss, are recovered in any desired manner well known in the art.

It will be noted in Figs. 29 and 30, that the upper end of the common side wall 109 of the sluiceways 25 and 26, ends a short distance from the corresponding end wall of said sluiceways, forming a common compartment for receiving material to be treated, from the troughs 23 and 24, and directing it to either or both of the sluiceways 25 and 26. A gate 109a may be conveniently used to prevent flow to either of the sluiceways 25 and 26, as desired, for example the sluiceway 25, when it is desired to renew the lining of porous material or moss, of said sluiceway, without interrupting the operation of the other of said sluiceways. Providing the sluiceways 25 and 26 with a common side wall 109 as described, thus permits flow to either of said sluiceways to be stopped by said gate 109a, as desired, or by removing said gate from said sluiceways, flow may be permitted to both of them simultaneously, which may be desired under some conditions.

From the above it will be observed that in the treatment sections A, B and C above described, I provide means for effectively recovering coarse metal particles from the material flowing through the main sluiceway 10, the conditions under which these recovering means operate, being readily adaptable to the effective recovery of such particles in any particular case. It will also be observed that the treatment in each of the sections A, B and C is effected by diverting or by-passing from the flow stream in the main sluiceway 10, a part of the water and mineral carried thereby, and that the diverted water, the mineral and the metal particles in the diverted water which are not recovered in the treatment in that section, are returned to the flow stream in the main sluiceway at the end of said section, for subsequent treatment, as desired. It will be understood that there may be as many of the treatment sections represented by the sections A, B and C, as are required to effectively recover the coarse metal particles.

Again, after the recovery of the coarse metal particles by the successive treatments illustrated in sections A, B and C, means are provided, as illustrated in sections D to J, for effectively recovering the medium metal particles and some of the fine metal particles, and it will be noted that the means employed in each of these sections are readily adaptable to the requirements of any particular case in this connection, and that for each of these treatment sections, a part of the water of the flow stream in the main sluiceway 10, is diverted or by-passed, carrying with it the medium metal particles and more or less of the fine metal particles, so that effective recovery may be accomplished by the means employed in these several treatment sections, and that for each of these treatment sections, the water delivered to the treatment section from the main sluiceway 10, and the mineral and metal particles carried thereby that are not recovered in said treatment section, are returned to the main water stream for subsequent treatment, as desired.

In this connection, it will be understood that the restricted passageways provided through the bottom wall of the main sluiceway to divert the water flow and metal particles therefrom, may be proportioned to suit the requirements of any particular case, and that the length of the bottom of the main sluiceway provided with these restricted passageways, may be as great as required to effectively accomplish this diversion from the flow in the main sluiceway, and further that there may be as many successive treatments represented by the treatment sections D to J, as are required to effectively recover the metal particles referred to.

It will also be observed that my system of recovery provides means for recovering the fine metal particles illustrated, as described, by the trough 37, and by the treatment sections I to XII in connection with each of the control tanks, and that for each of these treatment sections, a part of the water flow is diverted to the means employed in the corresponding treatment section, carrying with it the fine metal particles to be recovered by the treatment in that section, and that the water and metal particles not so diverted, are delivered to further recovering means, by which the small particles of rare metals, as well as any remaining particles of fine metal may be effectively recovered.

It will be understood that the control tanks may have any size and shape required to effectively accomplish their intended purpose in any particular case, and furthermore that each control tank may supply as many treatment sections as are found advisable or necessary in any particular case, and also that the special sluiceways referred to may have any size and proportions that are found to be desirable or necessary to effectively accomplish their intended purpose.

It will thus be seen that by my system I provide means for effectively and efficiently recovering from the mineral matter delivered to the main sluiceway 10, practically all of the particles of valuable metals that are in such condition that they can be recovered, and that where these valuable metal particles are in free condition, it is possible to recover practically all of them by using the recovery means described, adapted to the requirements of any particular case.

Another important result secured by my recovery system in its application to placer mining, is the protection of the recovery means from tampering, and the protection of the recovered metal particles from theft. From the circumstances attaching to placer mining, the main sluiceway employed is usually open and unprotected, and where the usual practice of recovering the metals by riffle bars in the main sluiceway is employed, theft is common. It will be observed that in accordance with my system, the means employed in each of the treatment sections A, B and C, to recover the coarse metal particles, are located under the bottom wall of the main sluiceway, as a result of which, access to said treating means during the flow of water and mineral in the main sluiceway, is impossible. Where, as is usually the case, it is required to periodically rearrange the means employed at the mineral deposit, to provide the mineral matter for delivery to the main sluiceway, the water flow in the main sluiceway is periodically and at corresponding intervals, stopped. During these intervals of cessation of water flow through the main sluiceway, the bottom plates 32, the planks 44, and the cross beams 45 of the treatment sections A, B and C, may be quickly removed, affording access to the riffle blocks 51 employed in the riffle boxes 34, and also to the riffle sumps 53. The construction of the riffle blocks 51, permits their ready removal, cleaning and replacement, so that the entire clean-up operation of the riffle blocks and riffle sumps, may readily be effected during the interval of cessation of the water flow in the main sluiceway, after which the riffle blocks 51 are given fresh mercury charges, and the beams 45, the planks 44, and the bottom plates 32 may be replaced for further operation of the main sluiceway, and all without requiring any delay in the operation of the mineral deposit.

Similarly, during intervals of cessation of flow in the sluiceway 10, the plates 36 and the bars 55 normally enclosing the trough 37 and preventing access thereto, may be quickly removed, the lining of said trough may be removed, fresh lining material may be placed in said trough, and the bars 55 and the plates 36 may be replaced ready for further operation, and the metal particles in the removed lining may be recovered by any suitable means known to the art.

It will also be observed that in each of the treatment sections E to J, the means employed for recovering the metal particles, are located below the sluiceway 10 and the walk 11, and enclosed by the structure of the walk and main sluiceway, so that they are not accessible during the operation of the main sluiceway. During cessations of flow in the main sluiceway as referred to, the bottom plates 36 and the bars 55 of the sluiceway, and the planks of the walk 11 are readily removable, affording access to the treatment means of each of sections E to J, the recovering means of the corresponding riffle boxes may be readily removed and replaced, the riffle blocks may be provided with fresh mercury charges, and the bars 55, the plates 36 and the planking of the walk may be replaced, so that the clean-up operation may be effected within any said period of cessation of water flow in the main sluiceway.

The control tanks and, if desired, the moss lined sluiceways, as well as the treating means employed in connection with the control tanks, may conveniently be housed in any suitable form of shelter, so that access to them is impossible to unauthorized persons.

It will thus be observed that by my system, I effectively protect the recovery means employed from tampering, and I also prevent theft of the metals recovered by the treatment means.

Unless otherwise specified, the structures described are preferably made of wood. In the several figures of drawings, excepting in connection with the treatment means employed in sections A, B and C, only the essential devices employed are illustrated, it being understood that suitable means are employed for supporting and holding the several devices in the relative relations illustrated. It will also be understood in connection with the recovery means associated with the control tanks, that convenient walks are preferably provided for affording access to said treatment means, which are not illustrated, as they do not constitute a part of the present invention, and may have any location and construction desired.

My system thus classifies the mineral and metal particles treated, and provides effective means for collecting and recovering the valuable metal particles of each classification, said means for each classification being particularly adapted to the recovery of metal particles of that classification. This is true regardless of the source of the mineral treated, or the manner in which said mineral is prepared for the recovering operations, since my apparatus and method may be effectively applied, wholly or in part, to the recovery of valuable metal particles from mineral matter, regardless of how said mineral matter is mined, of how it is supplied to my treatment apparatus, and regardless of whether the mineral matter containing the valuable metal particles to be recovered, receives preparatory treatment or not, before delivery to my treatment apparatus, the only requirement being that the mineral matter delivered to my apparatus for treatment, shall contain metal particles desired to be recovered and susceptible of recovery substantially as described. In some cases, one part of the apparatus and method described, may be sufficient to effect efficient recovery of the desired metal particles, while in other cases another part or parts of said apparatus and method may be needed to effect the desired recovery, depending upon the nature and condition of the mineral matter delivered to the treatment apparatus in any case, it being understood that any part or parts of my treatment apparatus and method described, may be used singly or in any desired combination, according to the treatment required in any case.

While I have shown my invention in the particular embodiment and as embodying the particular steps of treatment above described, it will be understood that I do not limit myself to these exact constructions and steps of treatment, as I may employ equivalents known to the art at the time of the filing of this application without departing from the scope of the appended claims.

What I claim is:

1. In a system of the class described, the combination of a main sluiceway having restricted passageways through its bottom for diverting water and metal particles from said main sluiceway, a main trough under and extending in the same direction as said main sluiceway for receiving the material so diverted from said main sluiceway, said main trough having spaced transverse partitions dividing said main trough into sections, riffle boxes extending in the same direction as said main trough for receiving material delivered respectively by said main trough sections, and a drain under and extending in the same direction as said riffle boxes for receiving material delivered from said riffle boxes, said drain at its lower end returning the material collected therein to the flow stream delivered by said main sluiceway for further treatment.

2. In a system of the class described, the combination of a main sluiceway having restricted passageways through its bottom for diverting water and metal particles from said main sluiceway, a main trough under said main sluiceway for receiving the material so diverted from said main sluiceway, said main trough having spaced transverse partitions dividing said main trough into sections, and a riffle box for receiving material delivered by each of said main trough sections, the bottom of said main sluiceway comprising laterally spaced transverse metal plates, intermediate metal bars each between and supporting adjacent ones of said plates, and means spacing the edges of said plates from said bars to form said restricted passageways.

3. In a system of the class described, the combination of a main sluiceway having restricted passageways through its bottom for diverting water and metal particles from said main sluiceway, a main trough under said main sluiceway for receiving the material so diverted from said main sluiceway, said main trough having spaced transverse partitions dividing said main trough into sections, and a riffle box for receiving material delivered by each of said main trough sections, the bottom of said main sluiceway comprising laterally spaced transverse metal plates, intermediate metal bars each between and supporting adjacent ones of said plates, and sheet metal separators on the ends of said bars spacing the edges of said plates from said bars to form said restricted passageways.

4. In a system of the class described, the combination of a main sluiceway having restricted passageways through its bottom for diverting water and metal particles from said main sluiceway, a main trough under said main sluiceway for receiving the material so diverted from said main sluiceway, said main trough having spaced transverse partitions dividing said main trough into sections, and a riffle box for receiving material delivered by each of said main trough sections, the bottom of said main sluiceway comprising transverse metal plates, intermediate metal supporting bars, and means spacing the edges of said plates from said bars to form said restricted passageways, said bars having edge flanges extending under the edge portions of adjacent ones of said plates.

5. In a system of the class described, the combination of a main sluiceway having restricted passageways through its bottom for diverting water and metal particles from said main sluiceway, a main trough under said main sluiceway for receiving the material so diverted from said main sluiceway, said main trough having spaced transverse partitions dividing said main trough into sections, and a riffle box for receiving material delivered by each of said main trough sections, the bottom of said main sluiceway comprising laterally spaced transverse metal plates, intermediate metal bars each between and supporting adjacent ones of said plates, and means spacing the edges of said plates from said bars to form said restricted passageways, said bars having grooves in them to contain mercury.

6. In a system of the class described, the combination of a main sluiceway having restricted passageways through its bottom for diverting water and metal particles from said main sluiceway, a main trough under and extending in the same direction as said main sluiceway for receiving the material so diverted from said main sluiceway, said main trough having spaced transverse partitions dividing said main trough into sections, and riffle boxes extending in the same direction as said main trough for receiving material delivered respectively by said main trough sections, the bottom of said main sluiceway comprising laterally spaced transverse metal plates, and intermediate metal bars each between and supporting adjacent ones of said plates, said bars having grooves in them to contain mercury.

7. In a system of the class described, the combination of a main sluiceway having restricted passageways through its bottom for diverting water and metal particles from said main sluiceway, a main trough under and extending in the same direction as said main sluiceway for receiving the material so diverted from said main sluiceway, said main trough having spaced transverse partitions dividing said main trough into sections, riffle boxes extending in the same direction as said main trough for receiving material delivered respectively by said main trough sections, a walk along said main sluiceway, said riffle boxes being located under said walk and enclosed thereby to prevent access to said riffle boxes, and transverse troughs extending from said main trough sections to said riffle boxes.

8. In a system of the class described, the combination of a main sluiceway having restricted passageways through its bottom for diverting water and metal particles from said main sluiceway, a main trough under and extending in the same direction as said main sluiceway for receiving the material so diverted from said main sluiceway, said main trough having spaced transverse partitions dividing said main trough into sections, riffle boxes extending in the same direction as said main trough for receiving material delivered respectively by said main trough sections, a walk along said main sluiceway, said riffle boxes being located under said walk and enclosed thereby to prevent access to said riffle boxes, and transverse troughs extending from said main trough sections to said riffle boxes, each of said main trough sections having at its lower end a hopper for collecting material from said section, each of said hoppers having an outlet for delivering the contents of said hopper to a corresponding one of said transverse troughs.

9. In a system of the class described, the combination of a main sluiceway having restricted passageways through its bottom for diverting water and metal particles from said main sluiceway, a main trough under and extending in the same direction as said main sluiceway for receiving the material so diverted from said main sluiceway, said main trough having spaced transverse partitions dividing said main trough into sections, riffle boxes extending in the same direction as said main trough for receiving material delivered respectively by said main trough sections, a walk along said main sluiceway, said riffle boxes being located under said walk and enclosed thereby to prevent access to said riffle boxes, and transverse troughs extending from said main trough sections to said riffle boxes, each of said main trough sections having at its lower end a hopper for collecting material from said section, each of said hoppers having an outlet for delivering the contents of said hopper to a corresponding one of said transverse troughs, and a gate on each of said hopper outlets and movable to control the rate of flow of material from said hopper to the corresponding one of said transverse troughs.

10. In a system of the class described, the combination of a main sluiceway having restricted passageways through its bottom, each of said passageways having portions at an angle to each other and effecting slow flow of water and metal particles therethrough from said sluiceway, a trough under said sluiceway for receiving the water and metal particles delivered from said passageways, and means for recovering the metal particles so received by said trough.

11. In a system of the class described, the combination of a main sluiceway having restricted passageways through its bottom, each of said passageways having portions at an angle to each other and effecting slow flow of water and metal particles therethrough from said sluiceway, and means for collecting the metal particles delivered from said passageways.

12. A main sluiceway having restricted passageways through its bottom, each of said passageways having portions at an angle to each other and effecting slow flow of water and metal particles therethrough from said sluiceway.

13. A main sluiceway having a bottom comprising transverse metal plates, and intermediate metal bars each between adjacent ones of said plates, the edges of said plates being spaced from said bars to form restricted passageways, each of said passageways having portions at an angle to each other and effecting slow flow of mineral particles therethrough.

14. In a system of the class described, the combination of a sluiceway having a bottom comprising transverse metal plates, intermediate metal bars each between adjacent ones of said plates, and means spacing the edges of said plates from said bars to form restricted passageways, each of said passageways having portions at an angle to each other and effecting slow flow of mineral particles therethrough, and means for collecting material flowing through said passageways.

15. A main sluiceway having a bottom comprising transverse metal plates, intermediate metal bars each between adjacent ones of said plates, and metal separators on the ends of said bars spacing the edges of said plates from said bars to form restricted passageways, each of said passageways having portions at an angle to each other and effecting slow flow of mineral particles therethrough.

16. In a system of the class described, the combination of a sluiceway having a bottom comprising transverse metal plates, intermediate metal bars each between adjacent ones of said plates, and metal separators on the ends of said bars spacing the edges of said plates from said bars to form restricted passageways, each of said passageways having portions at an angle to each other and effecting slow flow of mineral particles therethrough, and means for collecting material flowing through said passageways.

17. A main sluiceway having a bottom comprising transverse metal plates, intermediate metal bars each between adjacent ones of said plates, and means spacing the edges of said plates from said bars to form restricted passageways, each of said passageways having portions at an angle to each other and effecting slow flow of mineral particles therethrough, said bars having edge flanges extending under the edge portions of adjacent ones of said plates.

18. In a system of the class described, the combination of a sluiceway having a bottom comprising transverse metal plates, intermediate metal bars each between adjacent ones of said plates, and means spacing the edges of said plates from said bars to form restricted passageways, each of said passageways having portions at an angle to each other and effecting slow flow of mineral particles therethrough, and means for collecting material flowing through said passageways, said bars having edge flanges extending under the edge portions of adjacent ones of said plates.

19. A main sluiceway having a bottom comprising transverse metal plates, intermediate metal bars each between adjacent ones of said plates, and means spacing the edges of said plates from said bars to form restricted passageways, said bars having mineral collecting grooves in their upper surfaces.

20. In a system of the class described, the combination of a sluiceway having a bottom comprising transverse metal plates, intermediate metal bars each between adjacent ones of said plates, and means spacing the edges of said plates from said bars to form restricted passageways, and means for collecting material flowing through said passageways, said bars having mineral collecting grooves in their upper surfaces.

21. In a system of the class described, the combination of a sluiceway having a bottom comprising transverse metal plates, intermediate metal bars each between adjacent ones of said plates, and means spacing the edges of said plates from said bars to form restricted passageways, each of said passageways having portions at an angle to each other and effecting slow flow of mineral particles therethrough, means for collecting material flowing through said passageways, and means for treating and recovering metal particles so collected.

CHARLES B. ULRICH.